United States Patent
Hesler et al.

(10) Patent No.: US 6,407,515 B1
(45) Date of Patent: Jun. 18, 2002

(54) POWER REGULATOR EMPLOYING A SINUSOIDAL REFERENCE

(75) Inventors: John C. Hesler, Media, PA (US); Louis F. Lindauer, Wilmington, DE (US)

(73) Assignee: Lighting Control, Inc., Aston, PA (US)

( * ) Notice: Subject to any disclaimer, the term of this patent is extended or adjusted under 35 U.S.C. 154(b) by 0 days.

(21) Appl. No.: 09/440,322

(22) Filed: Nov. 12, 1999

(Under 37 CFR 1.47)

(51) Int. Cl.[7] .............................................. H05B 37/02
(52) U.S. Cl. ....................... 315/294; 315/224; 315/295; 315/297; 363/34
(58) Field of Search ................................ 315/291, 294, 315/295, 296, 297, 312, 194, 224; 363/95, 34

(56) References Cited

U.S. PATENT DOCUMENTS

| | | |
|---|---|---|
| 3,263,122 A | 7/1966 | Genuit |
| 4,277,726 A | 7/1981 | Burke |
| 4,277,728 A | 7/1981 | Stevens |
| 4,523,131 A | 6/1985 | Zansky |
| 4,538,093 A | 8/1985 | Melai |
| 4,663,569 A | 5/1987 | Alley et al. |
| 4,677,345 A | 6/1987 | Nilsson |
| 4,797,599 A | 1/1989 | Ference et al. |
| 4,998,046 A | 3/1991 | Lester |
| 5,004,972 A | 4/1991 | Roth |
| 5,018,058 A | 5/1991 | Ionescu et al. |
| 5,045,774 A | 9/1991 | Bromberg |
| 5,107,184 A | 4/1992 | Hu et al. |
| 5,182,702 A | 1/1993 | Hiramatsu |
| 5,225,741 A | 7/1993 | Auld, Jr. et al. |
| 5,251,119 A | 10/1993 | Maehara |
| 5,455,490 A | 10/1995 | Callahan et al. |
| 5,500,575 A | 3/1996 | Ionescu |
| 5,550,440 A | 8/1996 | Allison et al. |
| 5,559,405 A | 9/1996 | Notohamiprodjo |
| 5,608,295 A | 3/1997 | Moisin |
| 5,714,847 A | 2/1998 | Lindauer et al. |

FOREIGN PATENT DOCUMENTS

| | | |
|---|---|---|
| DE | AT 390532 | 7/1987 |
| GB | 2045549 | 10/1980 |

OTHER PUBLICATIONS

"Electronic Ballasts Using the Cost–Saving IR215X Drivers" (Control Integrated Circuit Designers' Manual, International Rectifier, Application Notes [AN–995–A] pp. C–59 to C–68).

*Primary Examiner*—David Vu
(74) *Attorney, Agent, or Firm*—Akin, Gump, Strauss, Hauer & Feld, L.L.P.

(57) ABSTRACT

A power regulator for use with an AC power source includes a voltage converter having a first input and a second input. The first input is connected with the AC power source and receives AC current therefrom. The second input is connected to a controller and receives a control signal therefrom. The voltage converter generates a substantially sinusoidal regulator output signal, the amplitude of which is responsive to the control signal. The power regulator also includes a controller having a first input and a second input. The first input receives the regulator output signal and the second input receives a set point signal. The set point signal determines the amplitude of a substantially sinusoidal reference signal which is substantially in-phase with the regulator output signal. The controller generates the control signal indicative of the instantaneous difference between the regulator output signal and the amplitude of the substantially sinusoidal reference signal. The amplitude of the substantially sinusoidal reference signal is independent of the amplitude of the AC power source and the amplitude of the regulator output signal.

24 Claims, 6 Drawing Sheets

POWER REGULATOR EMPLOYING A SINUSOIDAL REFERENCE

BACKGROUND OF THE INVENTION

The present invention relates to alternating current power regulators and more particularly to regulators providing regulated, substantially sinusoidal, alternating current to a variety of loads including but not limited to high intensity discharge lamps.

Present-day lighting applications require sophisticated control capabilities in order to minimize energy consumption and to provide for variable illumination needs of users. Control requirements are applicable to all kinds of lamps including incandescent lamps and electric discharge lamps such as fluorescent, mercury vapor, metal halide and high pressure sodium lamps. The most stringent control requirements are associated with a type of electric discharge lamps commonly known as high intensity discharge lamps.

High intensity discharge (HID) lamps such as metal halide (MH) or high pressure sodium (HPS) lamps are used in applications where large areas need to be lighted. Outdoor applications include street lighting, parking lot lighting. and stadium lighting. Typical indoor applications include warehouses, agricultural greenhouses and indoor arenas. It is desirable to be able to dim these lamps to save energy. On/off switching may be impractical, or may affect personnel safety, due to the approximately 20 minute warmup time required after turn-on before these types of lamps reach full intensity.

Conventional lamp dimmers are designed to work with incandescent lighting. Typical incandescent lamp dimmers employ thyristors to chop out a portion of each half cycle of alternating current (AC) sine wave supply current, thus reducing the amount of power delivered to the lamp. This approach is satisfactory for incandescent lamps because they are resistive in nature and have large thermal time constants which filter the abrupt change in lamp current without harmful effects to either the dimmer or the lamp. However, HID lamps, having an inherent negative resistance characteristic, require a high impedance source to ensure stable operation. The high impedance source is typically provided by an inductive ballast in series with the HID lamp. Conventional lamp dimmers employing half cycle regulation will not work satisfactorily with HID lamps because the rapid switching action of thyristors in combination with the inductive ballast results unacceptably large voltage transients.

A present approach to dim HID lamps is to use motorized Variacs™ or variable transformers operating with elaborate control electronics. The large mass of Variacs™ prevents real time line regulation and is prohibitively expensive except for very large installations. Another approach for dimming HID lamps is termed "step dimming" or "high-low dimming". This latter approach employs switches to select various size inductors or capacitors in the ballast circuit to alter the HID lamp current. Another approach, frequently used in tunnels, achieves a crude dimming effect by turning off every second or third lamp.

HID lamps are required to operate in strict conformance with manufacturers' operating requirements in order to achieve the utmost in lamp reliability. Typically, manufacturers require a specified warmup time before dimming is permitted, a cool-down time before re-ignition if the lamp arc has been lost and a maximum rate of dimming. Further, in order to achieve long lamp life and freedom from the lamp extinguishing during a brown-out, a dimmer should maintain a substantially constant output voltage despite wide and rapid power line fluctuations. Additional desirable characteristics of an HID dimmer include minimum injection of harmonics into the power line, the ability to sense a failed or removed lamp and programmable dimming.

The present invention is directed to providing an economical source of controlled power suitable for powering one or more incandescent lamps or ballasted electric discharge lamps. The present invention overcomes the problems inherent in the prior art by providing a solid state power regulator comprising a microcontroller capable of reacting to a multitude of command sources in combination with a voltage converter capable of supplying a regulated output voltage. The power regulator further provides the capability to respond to host computer commands, occupancy sensors, time-of-day dimming commands etc. and further includes the capability to adjust the "high" setting to 90% of maximum to take advantage of demand rebates. The power regulator implements manufacturer's imposed HID lamp operating rules including a warmup period before dimming is permitted, a cool-down period before re-ignition if the lamp arc is lost and rate of time for dimming. In addition the power regulator maintains a constant voltage level to the HID lamps substantially independent of power line fluctuations, and provides for detection of lamp faults due to lamp aging or due to catastrophic failure.

BRIEF SUMMARY OF THE INVETION

The present invention comprises a power regulator for use with an AC power source comprising a voltage converter having a first input and a second input, the first input being connected with the AC power source and receiving AC current therefrom and the second input being connected with a controller and receiving a control signal therefrom. The voltage converter generates a substantially sinusoidal regulator output signal, the amplitude of which is responsive to the control signal. The power regulator also comprises a controller having a first input and a second input, the first input receiving the regulator output signal and the second input receiving a set point signal, the set point signal determining the amplitude of a substantially sinusoidal reference signal and the reference signal being substantially in-phase with the regulator output signal. The controller generates the control signal indicative of the instantaneous difference between the regulator output signal and the amplitude of the reference signal wherein the amplitude of the reference signal is independent of the amplitude of the AC power source and the amplitude of the regulator output signal.

The present invention also provides a power regulator for use with an AC power source for regulating the power applied to at least one lamp comprising a voltage converter having a first input and a second input, the first input being connected with the AC power source and receiving AC current therefrom, and the second input being connected with a controller and receiving a control signal therefrom, the voltage converter providing a substantially sinusoidal regulator output signal, the voltage of which is responsive to the control signal. The power regulator also includes a controller having a first input and a second input, the first input receiving the regulator output signal and the second input receiving a set point signal, the controller generating the control signal based on a status of at least one lamp and a comparison of the voltage of the regulator output signal with a substantially sinusoidal reference signal, the amplitude of the reference signal being responsive to the set point signal and independent of the amplitude of the AC power source and the regulator output signal. The controller determines the status of the at least one lamp by comparing an output current of the regulator with at least one predetermined fault limit.

The present invention also includes a method of generating a substantially sinusoidal output voltage for powering at least one lamp with a power regulator connected to an AC power source comprising the steps of determining a status of the at least one lamp; generating a substantially sinusoidal reference signal responsive to a set point and the lamp status; generating the substantially sinusoidal output voltage; generating a control signal responsive to the difference between the substantially sinusoidal output voltage and the sinusoidal reference signal such that output voltage is proportional to the sinusoidal reference signal if the lamp has a regulation status; setting the output voltage to full output if the lamp has a power-up status; and setting the output power to zero if the lamp has a cool-down status.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
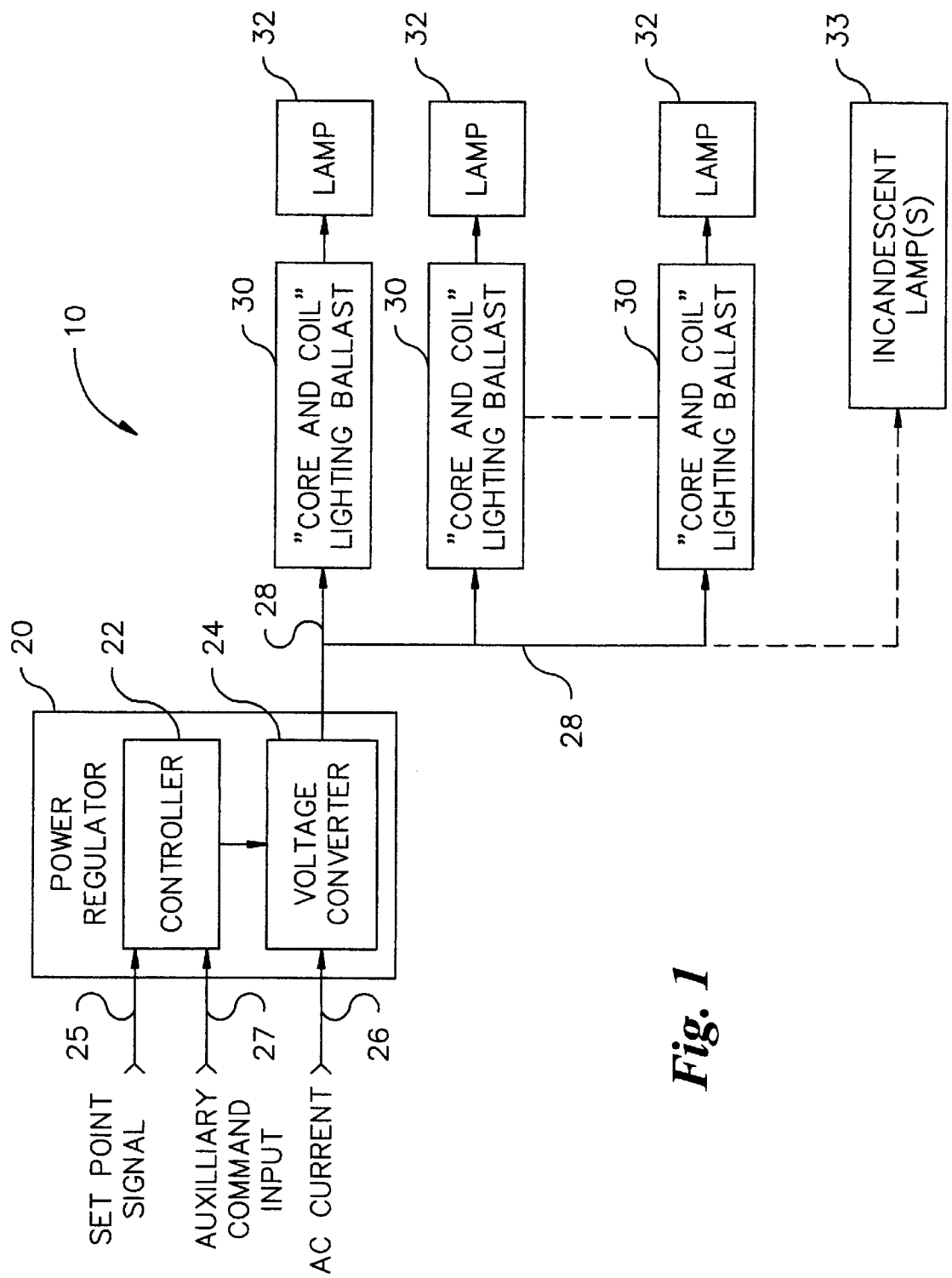
FIG. 1 is functional block diagram of a lamp dimmer system including a power regulator in accordance with the present invention.

Referring to the drawings in detail, where like numerals are used to indicate like elements throughout, there is shown in FIG. 1 a block diagram of a core and coil high intensity discharge (HID) lamp dimmer system 10 in accordance with the first preferred embodiment of the invention. The dimmer system 10 includes a power regulator 20, comprising a controller 22 and a voltage converter 24. The voltage converter 24 receives alternating current (AC current) along input line 26 directly from an AC power source (not shown) and provides an AC regulator output signal along output line 28. The regulator output signal is provided to one or more ballasted electric discharge lamps 32 such as metal halide or high pressure sodium lamps or to unballasted incandescent lamps 33. Each electric discharge lamp 32 is in series with a standard "core and coil" ballast 30 of a type conventionally used with electric discharge lamps and well known to those skilled in the art. The power regulator 20 accepts a set point signal along input line 25 which designates a preferred output voltage of the power regulator 20 (i.e. lamp illumination level). The power regulator 20 compares an internally generated analog of the set point signal received on input line 25 with the voltage of the regulator output signal provided on output line 28 to set the voltage of the regulator output signal to the preferred output voltage level and thus establish the desired illumination provided by the connected lamps 32, 33. Further, the power regulator responds to auxiliary commands on line 27 originating, for instance, from a sensor such as an occupancy sensor, a light sensor, or a timer which could adjust the illumination level according to the time of day. As may be appreciated by one skilled in the art, the set point signal along line 25 may be analog or digital; it may be a local or a remote manual operator adjustment of a power level selector; it may be a command generated within the power regulator 20; or it may be generated by external equipment such as a host computer and still be within the spirit and scope of the invention.

Figure 2:
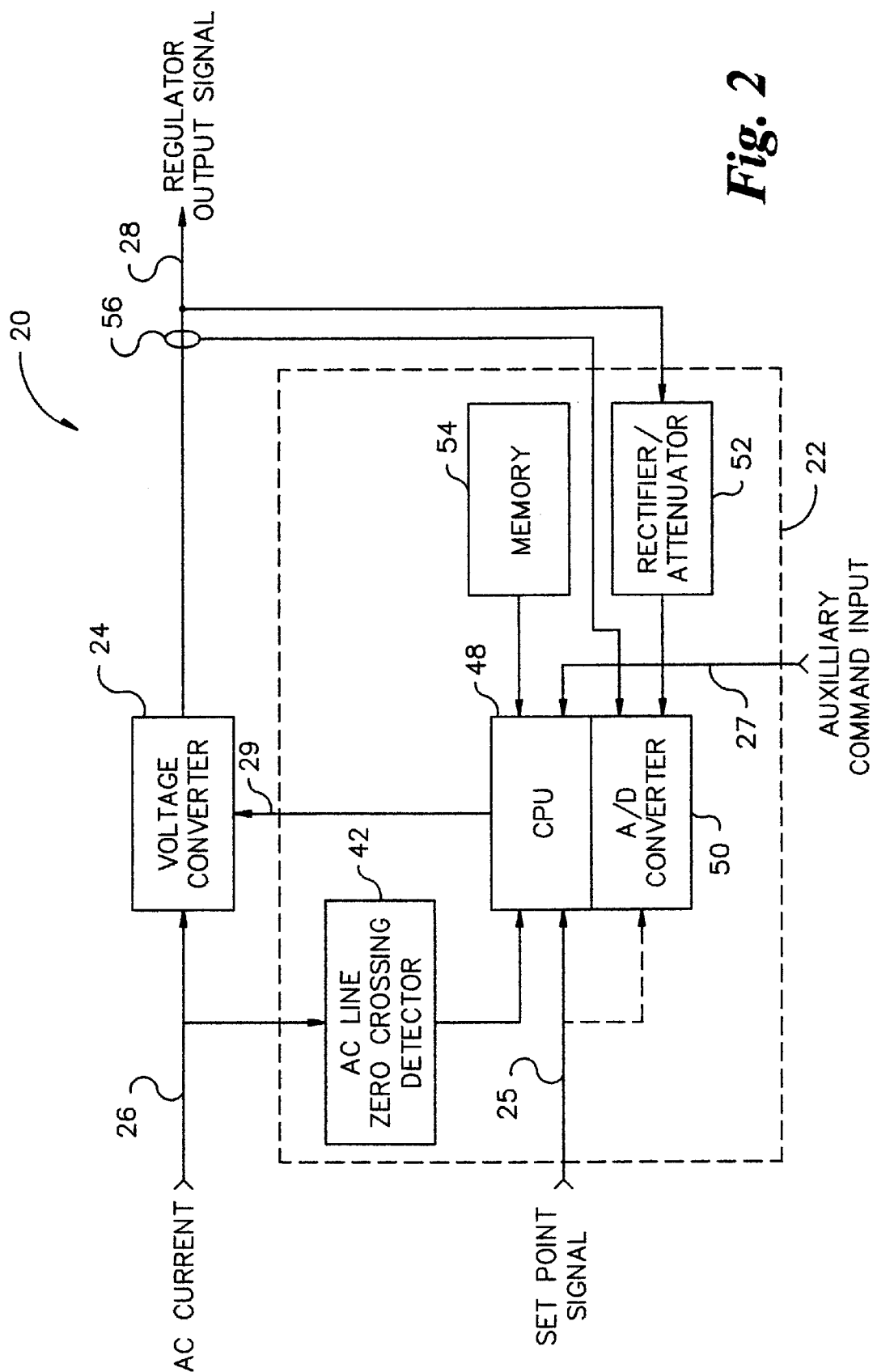
FIG. 2 is a functional block diagram of the power regulator of FIG. 1.

Referring now to FIG. 2 there is shown a functional block diagram of the power regulator 20 for use with the AC power source in accordance with the first preferred embodiment. The regulator 20 comprises a voltage converter 24 having a first input connected by line 26 to the AC power source and receiving AC current therefrom and a second input connected to a controller 22 and receiving a pulse width modulated (PWM) control signal therefrom along line 29. The voltage converter 24 generates a substantially sinusoidal regulator output signal, the amplitude of the regulator output signal being responsive to the control signal -received along line 29.

Figure 3:
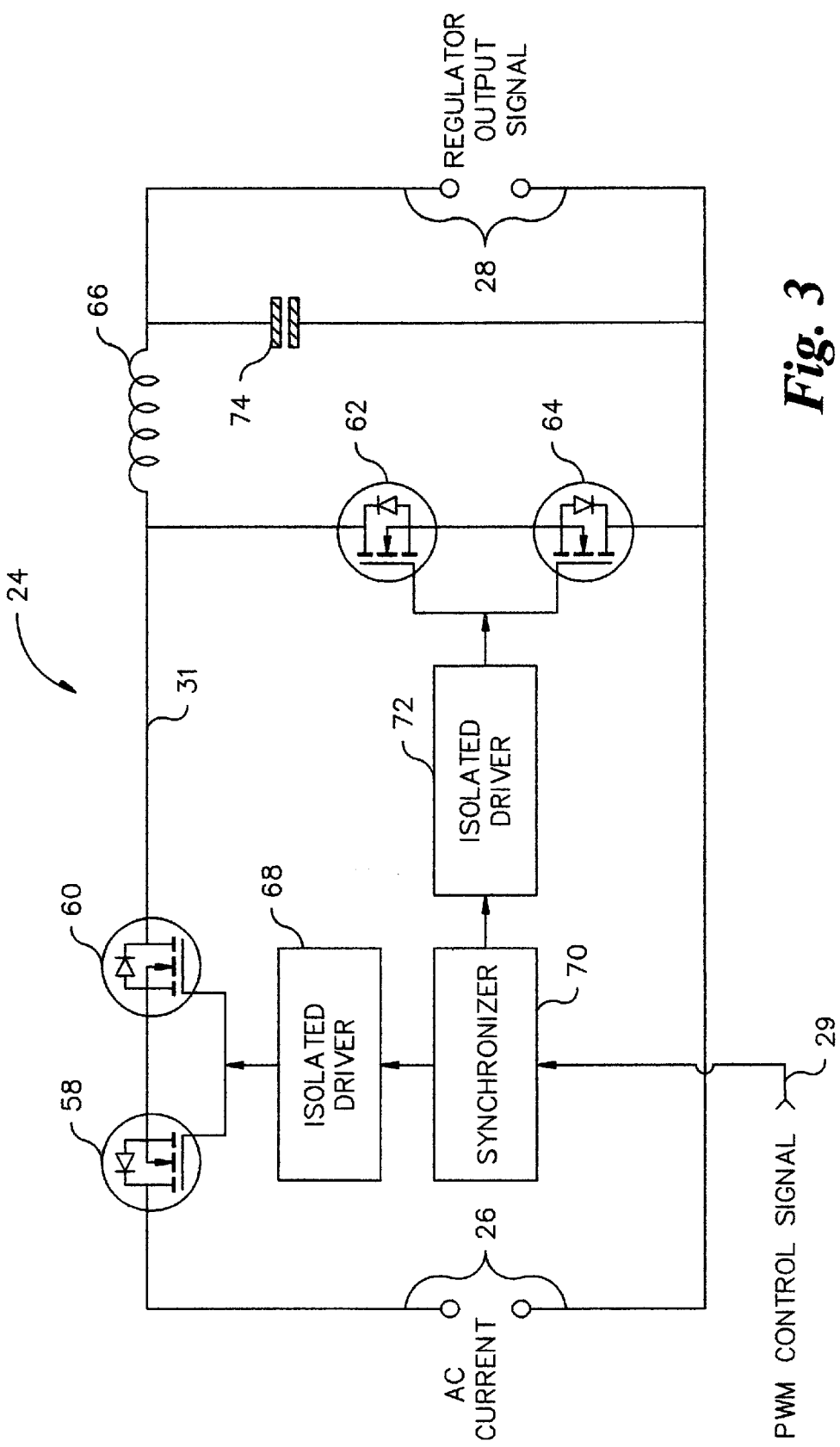
FIG. 3 is a schematic diagram of the voltage converter of FIG. 1.
Figure 4A:
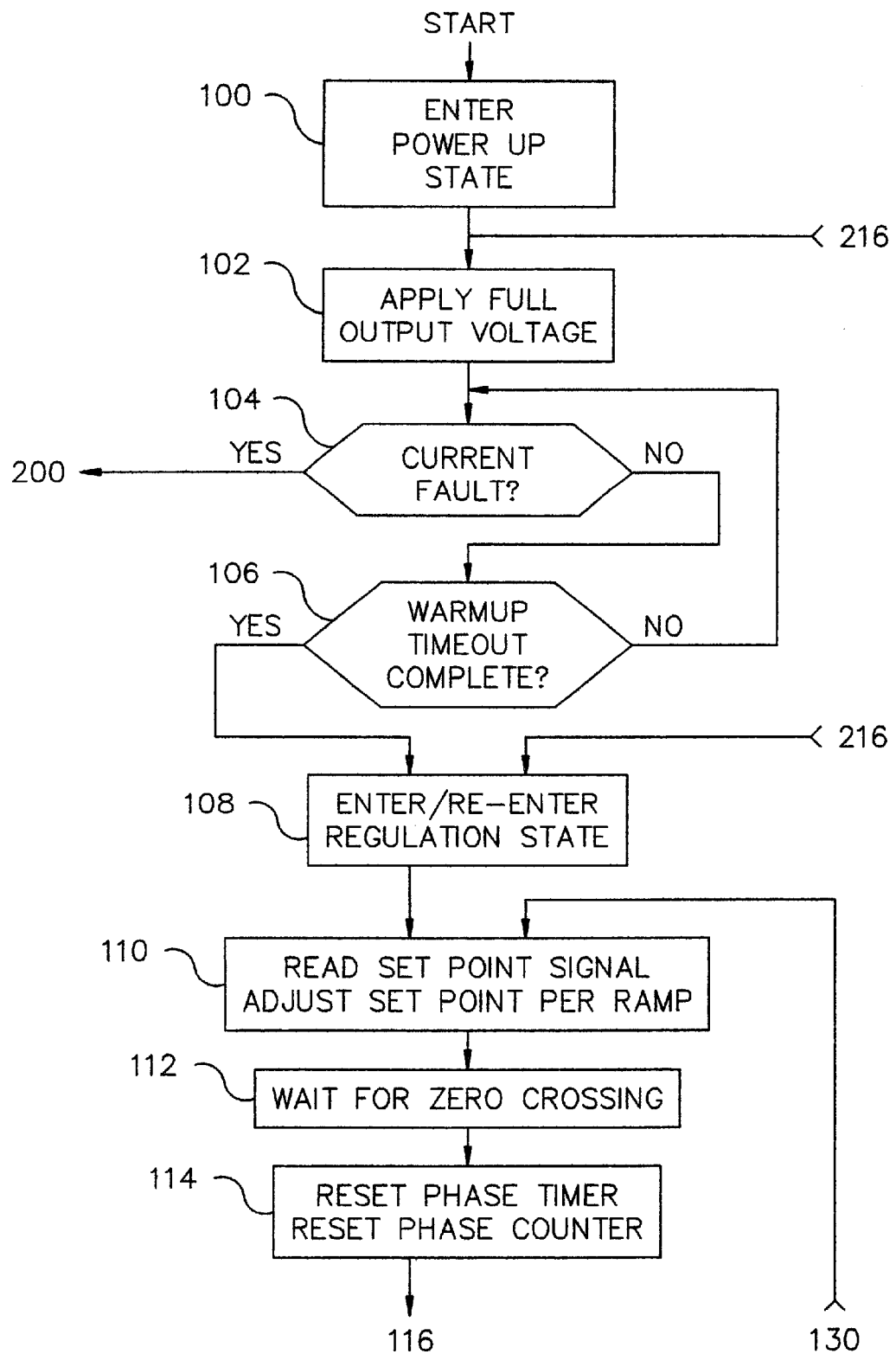
FIGS. 4a–4b are flow diagrams of the principal control loop executed by the power regulator of FIG. 2.
Figure 4B:
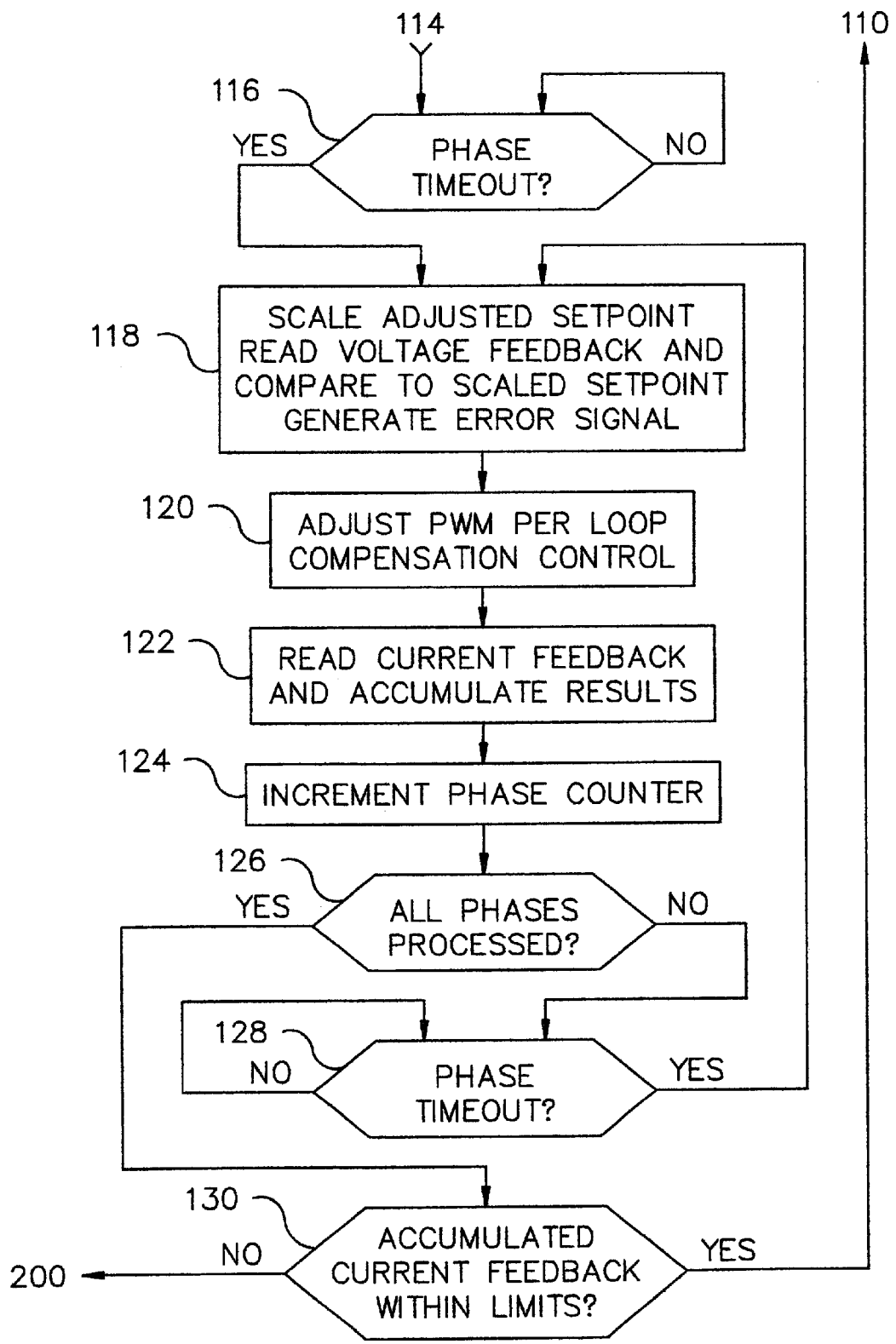
Figure 5:
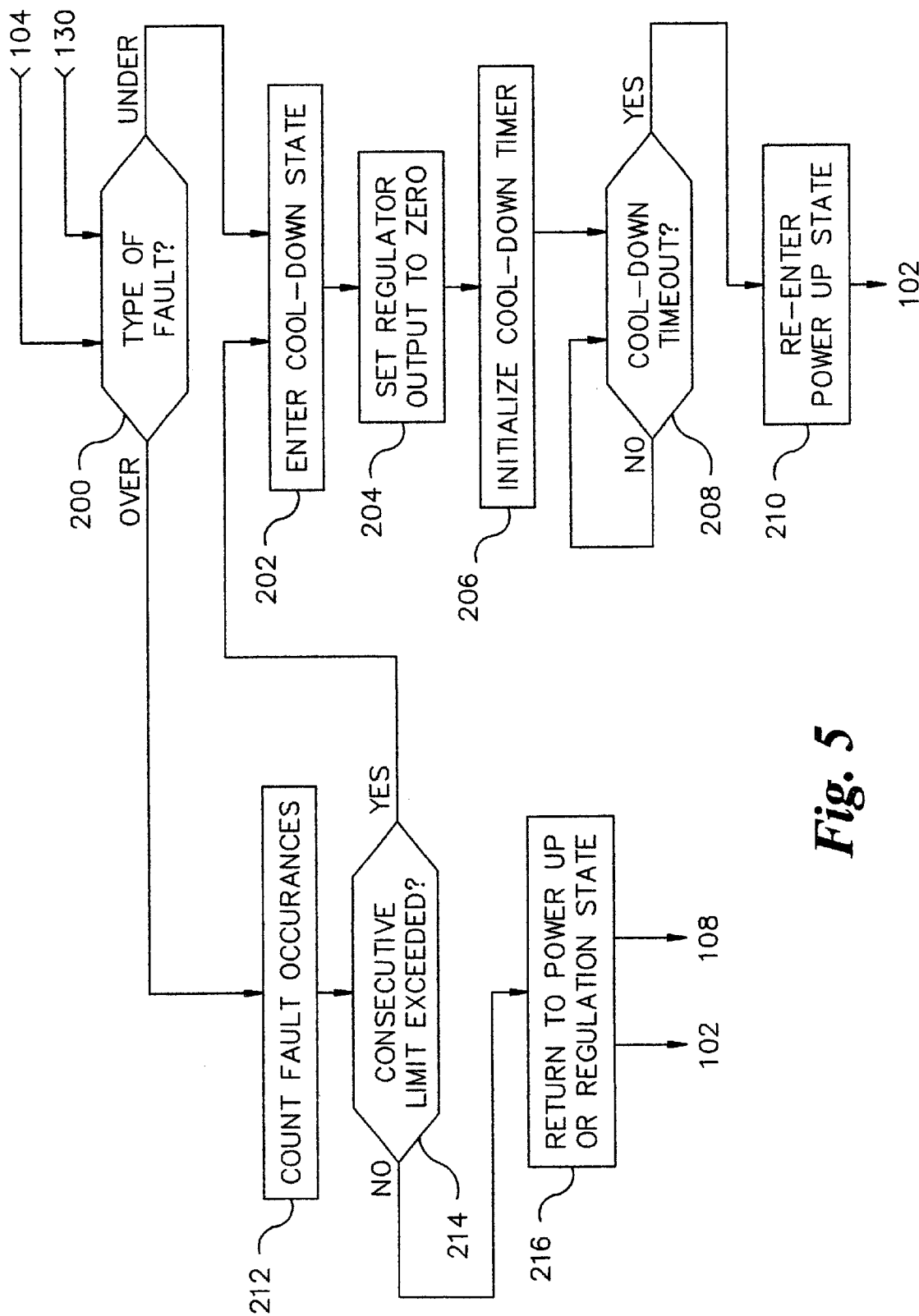
FIG. 5 is a flow diagram of the fault control loop executed by the power regulator of FIG. 2.

Referring now to FIG. 3 there is shown a block diagram of the voltage converter 24 in accordance with the first preferred embodiment. The voltage converter 24 is an AC throughput high frequency switching voltage regulator employing a four quadrant buck converter of a topology well known to those skilled in the art. In the first preferred embodiment, voltage converter 24 comprises a first-control circuit 58, 60 interrupting the flow of the input AC current for periods of time responsive to the control signal from the controller 22 to generate an intermediate AC current output on line 31. In the first preferred embodiment the first control circuit comprises MOSFET switches 58, 60 but may comprise any appropriate switching devices. The MOSFETs 58, 60 form a bidirectional switching element which is switched on and off at a substantially fixed frequency of approximately 100 KHz. The on/off ratio of the MOSFETs 58, 60 is determined by the duty cycle of the PWM control signal received along line 29. The voltage level of the intermediate AC current from the MOSFETs 58, 60 has an average value equal to the product of the voltage of the input AC current and the duty cycle. A filtering circuit 66, 74 receives the intermediate AC current from the first control circuit 58, 60 and generates the regulator output signal which is smoothed relative to the intermediate AC current and is applied to a load (not shown). The filtering circuit comprises an inductor 66 and a capacitor 74 which together form a low pass filter which removes high frequency components from the intermediate AC current which are higher than the frequency of the input AC current. A second control circuit 62, 64 also receives the intermediate AC current and acts as an open circuit when the first control circuit 58, 60 is conducting the input AC current and as a closed circuit when the first control circuit 58, 60 is interrupting the flow of the input AC current. In the first preferred embodiment the second control circuit 62, 64 comprises MOSFET switches 62, 64 acting as a bidirectional switching element but may comprise any appropriate switching devices. The MOSFETs 62, 64 form the "catch" elements for the buck converter allowing for the continuation of current through the inductor 66 and load during the off portion of the first control circuit 58, 60.

The first control circuit 58, 60 and the second control circuit 62, 64 are driven by the isolated drivers 68, 72. In the first preferred embodiment the isolation is achieved by light emitting diode transmitters and photo diode receivers. However, as will be appreciated by those skilled in the art, other means for isolation such as transformers may be used within the spirit and scope of the invention. A synchronizer 70 receives the control signal from the controller 22 and generates separate pulse streams to the first control circuit 58, 60 and the second control circuit 62, 64. The action of the synchronizer 70 ensures that the first control circuit 58, 60 is non-conducting when the second control circuit 62, 64 is conducting and vice versa, thereby preventing a short circuit of the input AC current. It will be apparent to those skilled in the art that the voltage converter is not limited to being a four quadrant buck converter. For example, the voltage converter could comprise a rectifier section followed by any one of several kinds of converters such as buck-boast, flyback, half bridge and full bridge followed by an H bridge for AC restoration and still be within the spirit and scope of the invention.

In a conventional method of obtaining closed loop feedback in an AC regulator, the output voltage is monitored, rectified and attenuated to form a low voltage pulsating DC signal proportional to the instantaneous output voltage. At the same time, the AC line voltage is monitored, rectified and variably attenuated to form a set point signal. The amount of line voltage attenuation is relative to the desired regulator output voltage. The instantaneous difference between the attenuated line voltage and the regulator output voltage forms an error signal which provides a PWM control signal to an AC voltage converter. An inherent fault in this type of feedback regulation is that it does not provide line regulation.

Referring now to FIG. 2 the first preferred embodiment further comprises a controller 22 having a first input receiving the regulator-output signal and a second input receiving the set point signal. The set point signal determines the amplitude of a substantially sinusoidal reference signal which is substantially in-phase with the regulator output signal. The controller 22 generates the output control signal which is applied along line 29 to the voltage converter 24 indicative of the instantaneous difference between the regulator output signal and the amplitude of the reference signal. The amplitude of the substantially sinusoidal reference signal is independent of the amplitude of the input AC power source and the amplitude of the regulator output signal.

In the first preferred embodiment, the controller 22 comprises a microprocessor based computer including a central processing unit (CPU) 48, memory 54, an A/D converter 50, and a universal asynchronous receiver-transmitter (UART) (not shown) for accepting set point or control data along line 25 in serial data format. In the first preferred embodiment, the computer is a Microchip Corporation type PIC 16C72. However, as will be appreciated by one skilled in the art, other types of computers could be used within the spirit and scope of the invention. Further, as will be appreciated by those skilled in the art, specific functions of the controller 22 may be performed within a computer or may be performed by separate components, either analog or digital, and still be within the spirit and scope of the invention.

The controller 22 of the first preferred embodiment also includes a sinusoidal reference generator (not shown) from which the substantially sinusoidal reference is produced. The reference generator is formed from a look-up table in the memory 54 which stores eighty-nine discrete values of a sine function. As will be appreciated by one skilled in the art, the reference generator need not store precisely eighty-nine values of the sine function;- Further, the sine function could be generated by other means such as by solving an algebraic expression or by executing a digital filter algorithm and still be within the spirit and scope of the invention.

The sinusoidal reference signal is caused to be in phase with the regulator output signal by an AC line zero crossing detector 42 which receives the input AC current and generates a synchronizing signal. Each time the voltage of the input AC current reverses polarity, the synchronizing signal generated by the AC zero crossing detector 42 signals the CPU 48 that the voltage of the AC current is at zero degrees. The CPU 48 then enters a timing loop and a counting loop for the next two voltage quadrants of the AC current. In the first preferred embodiment the timing and counting loops measure out two degree intervals of the phase of the voltage of the AC current for eighty-nine intervals. The CPU 48 reads a value of the sine function from the reference generator look-up table stored in the memory 54 corresponding to each phase interval. The value read from the sine function look-up table is multiplied by the set point signal, the value of which is read by the CPU 48 at the conclusion of each two quadrants, to form the sinusoidal reference signal. Since the reference signal is the product of only the set point signal and the values of a sine function stored in the memory 54, the reference signal is independent of both the amplitude of the AC power source and the amplitude of the regulator output signal.

In the first preferred embodiment of FIG. 2, the regulator output is rectified and attenuated by a rectifier/attenuator 52. The CPU 48 strobes the A/D converter 50 to sample the instantaneous output values of the output voltage of the rectifier/attenuator 52 at a time slightly delayed from each phase interval time of the voltage of the input AC current to account for the fixed phase delay through the voltage converter 24. Each sample of the instantaneous difference between the rectified and attenuated voltage of the regulator output signal and the substantially sinusoidal reference signal is applied to a loop compensation control algorithm executing in the CPU 48. The loop compensation computation numerical output is converted to the pulse width modulated control signal by the CPU 48 to provide the variable duty cycle of the control signal pulse train in proportion to the loop compensation computation output level thus controlling the voltage converter 24 output voltage to be proportional to the set point signal.

The magnitude of the regulator output signal that may be applied to a lamp 32, 33 at any given time depends upon the status of the lamp 32, 33. The first preferred embodiment of the regulator 20 is particularly adapted to powering electric discharge lamps 32 of the high intensity discharge (HID) type. An HID lamp 32 may be in either a power-up status, a regulation status or a cool-down status. In the first preferred embodiment the status of an HID lamp 32 is determined by measuring the current drawn by the HID lamp 32 and comparing that current with known values. The first preferred embodiment of the power regulator 20 includes a current sensor 56 which provides a signal to the controller 22 proportional to the output current of the regulator 20. In the first preferred embodiment, the output current of the regulator 20 is sampled concurrent with sampling the regulator output voltage, accumulated and compared to one or more predetermined limits by the controller 22 to determine the status of the lamps 32 (see FIG. 1) connected to the power regulator 20. In the first preferred embodiment, an over current limit and an undercurrent limit are employed to establish the status of each lamp 32. Depending on the status of the HID lamp 32, the controller 22 adjusts the control signal to turn the output of the power regulator 20 off, to provide full output voltage or to provide a dimming level of voltage. As may be appreciated by one skilled in the art, the overcurrent and undercurrent limits need not be fixed but may be made variable depending upon, for example, the type of lamps, number of lamps and the lamp history.

In the first preferred embodiment, the dimming rate of the HID lamps 32 is limited to a maximum value to avoid quenching the arc of the HID lamp 32 by a too rapid reduction of the voltage applied to the lamp 32. In the first preferred embodiment the controller 22 generates a ramp signal that is used to adjust the value of the set point signal. The ramp signal adjusts the set point signal to a series of values between a present adjusted set point signal value and a new set point signal value to ramp the power regulator 20 dimming in a controlled manner from the present set point signal value to the new set point signal value. The specific ramp rate depends upon the status of the HID lamp 32, characteristics of the HID lamp 32 specified by the manufacturer and the elapsed time since the present dimming set point of the HID lamp 32 was received.

Referring now to FIGS. 1, 2, 4a–4b and 5 there is shown a first preferred method for powering at least one HID lamp 32 with a power regulator 20 having voltage converter 24 connected to an AC power source and a controller 22. In a first step, 100, the power regulator is set to the power-up state. At step 102, full power is applied to the lamp 32. At step 104, output current from the regulator 20 is detected by the current sensor 56 and provided to the controller 22 to determine if the output current is within acceptable limits. If a fault is detected the regulator output current is compared with an overcurrent limit and an undercurrent limit at step 200. If the output current of the regulator 20 exceeds the overcurrent limit for all of approximately 10 cycles of the input AC current (steps 212, 214) the regulator state is set to the cool-down state (step 202) and the output voltage of the regulator 20 is set to zero (step 204) for a predetermined time period established by the manufacturer (steps 206, 208). If the overcurrent limit is exceeded for less than the required number of cycles (step 214), the regulator 20 is returned to the power-up state (steps 216, 102) and full voltage is applied to the lamp 32.

The cool-down state at step 202 is also entered if the measured output current of the regulator 20 is less than the undercurrent limit (step 200). The undercurrent limit is set to detect the absence of an arc. At the conclusion of the cool-down time-out period, the regulator 20 re-enters the power-up state (step 210) and full voltage is applied to the lamp 32 at step 102.

If no current fault is at step 104, full voltage is applied to the lamp for the manufacturers specified warm-up time (step 106). At the conclusion of the warm-up time, which is typically fifteen minutes, the power regulator is placed in the regulation state at step 108. Once in the regulation state, the regulator assumes full regulation of the output voltage by comparison of the regulator output voltage with the sinusoidal reference signal. Additionally, the HID lamp 32 may be dimmed according to a set point signal and a predetermined rate of dimming.

Loop 110 to 130 describes the process of sampling the output voltage and the output current of the regulator 20 over one half cycle (180 degrees) of the input AC current. At step 110, which occurs at the conclusion of the previous one-half cycle, the desired illumination level, as represented by the set point signal, is read by the controller 22. If the value of the set point signal is less than full illumination, the set point signal is adjusted by the ramp signal in accordance with the maximum dimming rate. At steps 112 and 114, the output of the AC line zero crossing detector 42, resets a phase timer and a phase counter to zero. In step 1 16 the phase timer establishes the desired phase intervals, which in the first preferred embodiment are two degrees. At each phase interval, the adjusted set point signal is scaled by the value of the sinusoidal reference generator output to form the reference signal. The reference signal is compared with a sample of the voltage output of the regulator voltage feedback signal to generate an error signal which is processed by the loop compensation control algorithm (step 120). The output of the loop compensation control algorithm is converted to pulse width modulation to complete the regulator voltage feedback loop. Concurrent with sampling the output voltage of the regulator 20, the output current of the regulator 20 is sampled and accumulated at step 122. At steps 124 and 126 the phase interval counter is incremented and the phase intervals are counted. If the number of intervals is less than the total number of intervals in the one-half cycle (step 126) the phase timer increments (step 128) and the voltage and current sampling continues. If the number of phase intervals reaches the maximum number, the sampling for the one-half cycle stops and the accumulated current is compared with the overcurrent and undercurrent limits (step 130). If the accumulated current is within the undercurrent and overcurrent limits, regulation continues at step 110. If the accumulated current is outside either the overcurrent or undercurrent limit, processing continues in the fault loops (steps 200–216) as previously described. Depending upon the result of fault processing, operation continues in either the power-up state (step 102) or the regulation state (step 108).

The power regulator 20 is also suitable for powering one or more core and coil ballasted fluorescent lamps. Ballasted fluorescent lamps 32 do not require a controlled warmup period, a controlled cool-down period or a controlled dimming rate but otherwise have power requirements similar to HID lamps 32. Accordingly, a second preferred embodiment of the power regulator 20 for powering fluorescent lamps 32 is identical to the first preferred embodiment except that the controller 22 is programmed to provide instant turn-on instead of a predetermined warmup time (step 106), rapid re-start instead of an extended cool-down time (step 202) and instantaneous dimming instead of a controlled dimming rate (steps 110–118).

The power regulator 20 is also suitable for powering one or more incandescent lamps 33. Incandescent lamps 33 do not require a controlled warmup period, a controlled cool-down period or a controlled dimming rate but do require controlled turn-on current to avoid current surges in cold filaments. Accordingly, a third preferred embodiment of the power regulator 20 for powering incandescent lamps 33 is identical to the first preferred embodiment except that steps 102 and 106 are not executed, step 202 provides rapid re-start instead of an extended cool-down time and the lamp signal is used to control the rate of increased illumination (steps 110–118) instead of being used to control the rate of dimming.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A power regulator for use with an AC power source comprising:

a voltage converter having a first input and a second input, the first input being connected with the AC power source and receiving AC current therefrom and the second input being connected with a controller and receiving a control signal therefrom, the voltage converter generating a substantially sinusoidal regulator output signal, the amplitude of which is responsive to the control signal; and a controller having a first input and a second input, the first input receiving the regulator output signal and the second input receiving a set point signal, the set point signal determining the amplitude of a substantially sinusoidal reference signal, the substantially sinusoidal reference signal being substantially in-phase with the regulator output signal, the controller generating the control signal indicative of the instantaneous difference between the regulator output signal and the amplitude of the substantially sinusoidal reference signal wherein the amplitude of the substantially sinusoidal reference signal is independent of the amplitude of the AC power source and the amplitude of the regulator output signal.

2. The power regulator according to claim 1 wherein the regulator output signal is connected to at least one series combination of a core and coil ballast and an electric discharge lamp.

3. The power regulator according to claim 1 wherein the regulator output signal is connected to at least one incandescent lamp.

4. The power regulator according to claim 1 wherein the voltage converter comprises a first control circuit interrupting flow of the AC current for periods of time responsive to the control signal to generate an intermediate AC current and a filtering circuit receiving the intermediate AC current from the first control circuit and generating the regulator output signal which is smoothed relative to the intermediate AC current, the filtering circuit comprising an inductor receiving the intermediate AC current and attenuating therefrom frequency components higher than the frequency of the AC current and a second control circuit receiving the intermediate AC current and acting as an open circuit when the first control circuit is conducting the AC current and as a closed circuit when the first control circuit is interrupting flow of the AC current wherein the regulator output signal is applied to a load.

5. The power regulator according to claim 1 further comprising a reference generator.

6. The power regulator according to claim 5 wherein the reference generator comprises a look-up table storing a predetermined number of discrete values of a sinusoidal function.

7. The power regulator according to claim 5, wherein the amplitude of the substantially sinusoidal reference signal is the product of the set point signal and an output from the reference generator.

8. The power regulator according to claim 7 wherein the set point signal is generated by at least one of a sensor signal, a timer signal and a power level selector.

9. A power regulator for use with an AC power source for regulating the power applied to at least one lamp comprising:

a voltage converter having a first input and a second input, the first input being connected with the AC power source and receiving AC current therefrom, and the second input being connected with a controller and receiving a control signal therefrom, the voltage converter providing a substantially sinusoidal regulator output signal, the voltage of which being responsive to the control signal; and a controller having a input and a second input, the first input receiving the regulator output signal and the second input receiving a set point signal, the controller generating the control signal based on a status of at least one lamp and a comparison of the voltage of the regulator output signal with a substantially sinusoidal reference signal, the amplitude of the reference signal being responsive to the set point signal and independent of the amplitude of the AC power source and the regulator output signal, the controller determining the status of the at least one lamp by comparing an output current of the regulator with at least one predetermined fault limit.

10. The power regulator according to claim 9 wherein the voltage converter comprises a first control circuit interrupting flow of the AC current for periods of time responsive to the control signal to generate an intermediate AC current and a filtering circuit receiving the intermediate AC current from the first control circuit and generating the regulator output signal which is smoothed relative to the intermediate AC current, the filtering circuit comprising an inductor receiving the intermediate AC current and attenuating therefrom frequency components higher than the frequency of the AC current and a second control circuit receiving the intermediate AC current and acting as an open circuit when the first control circuit is conducting the AC current and as a closed circuit when the first control circuit is interrupting flow of the AC current wherein the regulator output signal is applied to the at least one lamp.

11. The power regulator according to claim 9 wherein the output of the regulator is connected to at least one series combination of a core and coil ballast and an electric discharge lamp.

12. The power regulator according to claim 9 wherein the output of the regulator is connected to at least one incandescent lamp.

13. The power regulator according to claim 9 wherein the controller includes a reference generator.

14. The power regulator according to claim 13 wherein the reference generator comprises a look-up table storing a predetermined number of discrete values of a sinusoidal function.

15. The power regulator according to claim 14, wherein the amplitude of the reference signal is the product of an adjusted set point signal and an output of the reference generator.

16. The power regulator according to claim 15, the adjusted set point signal is the product of the set point signal and a ramp signal, the ramp signal being a function of at least one lamp status.

17. The power regulator according to claim 9 wherein the at least one predetermined fault limit includes an overcurrent limit and an undercurrent limit.

18. The power regulator according to claim 9 wherein the set point signal is generated by at least one of a sensor signal, a power selector responsive to an operator adjustment and a timer.

19. A method of generating a substantially sinusoidal output voltage for powering at least one lamp with a power regulator connected to an AC power source comprising the steps of:

determining a status of the at least one lamp;

generating a substantially sinusoidal reference signal responsive to a set point and the lamp status;

generating the substantially sinusoidal output voltage;

generating a control signal responsive to the difference between the substantially sinusoidal output voltage and the substantially sinusoidal reference signal such that output voltage is proportional to the substantially sinusoidal reference signal if the lamp has a regulation status;

setting the output voltage to full output if the lamp has a power-up status; and setting the output voltage to zero if the lamp has a cool-down status.

20. A method of powering at least one lamp according to claim 19 wherein if the lamp is a high intensity discharge lamp the rate of dimming is controlled by a ramp signal.

21. A method of powering at least one lamp according to claim 19 wherein if the lamp is an incandescent lamp the rate of increased illumination is controlled by a ramp signal.

22. A method of powering at least one lamp according to claim 19 wherein the status of the at least one lamp is determined by measuring an output current of the regulator.

23. A method of powering at least one lamp according to claim 22 wherein the output current of the regulator is compared with an overcurrent limit and an undercurrent limit for determining the status of the at least one lamp.

24. A method of powering at least one lamp according to claim 19 wherein the substantially sinusoidal reference signal is substantially in phase with the output voltage.

* * * * *